US012766969B2

(12) United States Patent
Tennevall et al.

(10) Patent No.: US 12,766,969 B2
(45) Date of Patent: Oct. 20, 2026

(54) AIR COOLED RESISTOR ARRANGEMENT

(71) Applicant: Volvo Truck Corporation, Gothenburg (SE)

(72) Inventors: Peter Tennevall, Malmö (SE); Magnus Ising, Lund (SE); Andreas Grandicki, Limhamn (SE); Fredrik Rahm, Hörby (SE)

(73) Assignee: Volvo Truck Corporation, Gothenburg (SE)

( * ) Notice: Subject to any disclaimer, the term of this patent is extended or adjusted under 35 U.S.C. 154(b) by 163 days.

(21) Appl. No.: 18/739,103

(22) Filed: Jun. 10, 2024

(65) Prior Publication Data

US 2025/0001872 A1 Jan. 2, 2025

(30) Foreign Application Priority Data

Jun. 29, 2023 (EP) .................................... 23182258

(51) Int. Cl.
*B60L 7/22* (2006.01)
*H01C 1/082* (2006.01)

(52) U.S. Cl.
CPC ................ *B60L 7/22* (2013.01); *H01C 1/082* (2013.01)

(58) Field of Classification Search
CPC .. B60L 7/22; B60L 7/02; H01C 1/082; H01C 1/08
USPC ......................................... 318/376, 375, 362
See application file for complete search history.

(56) References Cited

U.S. PATENT DOCUMENTS

| | | | |
|---|---|---|---|
| 2,858,402 | A | 10/1958 | Griffes et al. |
| 2,875,310 | A | 2/1959 | Schoch |
| 3,624,581 | A | 11/1971 | Owen |
| 4,503,944 | A | 3/1985 | Burckhardt et al. |

(Continued)

FOREIGN PATENT DOCUMENTS

| | | | |
|---|---|---|---|
| CN | 217902819 | U | 11/2022 |
| DE | 202013010291 | U1 | 2/2014 |

(Continued)

OTHER PUBLICATIONS

Examination Report for European Patent Application No. 23182258.6, mailed Nov. 18, 2025, 5 pages.

(Continued)

*Primary Examiner* — David Luo
(74) *Attorney, Agent, or Firm* — Withrow & Terranova, PLLC

(57) ABSTRACT

An air cooled resistor arrangement, comprising a resistor housing comprising an air inlet, an air outlet, a first inner wall extending in a direction from the air inlet to the air outlet, a second inner wall extending in direction from the air inlet to the air outlet, the first and second inner walls forming a primary air flow passage between the air inlet and the air outlet, a first outer wall extending in direction from the air inlet to the air outlet, and a first intermediate wall extending in direction from the air inlet to the air outlet, the first intermediate wall being arranged between the first inner wall and the first outer wall, and a plurality of elongated resistor elements arranged in the resistor housing, each of the plurality of elongated resistor elements comprises at its end portion an electrical connector element connectable to a source of electric power.

15 Claims, 5 Drawing Sheets

(56) References Cited

U.S. PATENT DOCUMENTS

| | | | | | |
|---|---|---|---|---|---|
| 5,431,548 | A * | 7/1995 | Koble, Jr. | F04D 13/08 415/230 |
| 6,430,045 | B1 * | 8/2002 | Everitt | B60T 10/00 338/53 |
| 8,847,524 | B2 * | 9/2014 | Mazumdar | B60L 7/06 318/362 |
| 12,347,590 | B2 * | 7/2025 | Rahm | H01C 1/082 |

FOREIGN PATENT DOCUMENTS

| | | | |
|---|---|---|---|
| EP | 4185072 | A1 | 5/2023 |
| JP | 20210158221 | A | 4/2023 |
| WO | 2012174030 | A2 | 12/2012 |
| WO | 2012174030 | A3 | 7/2013 |
| WO | 2016099977 | A1 | 6/2016 |

OTHER PUBLICATIONS

Extended European Search Report for European Patent Application No. 23182258.6, mailed Dec. 7, 2023, 5 pages.

Extended European Search Report for European Patent Application No. 23182259.4, mailed Jan. 4, 2024, 8 pages.

* cited by examiner

AIR COOLED RESISTOR ARRANGEMENT

PRIORITY APPLICATIONS

The present application claims priority to European Patent Application No. 23182258.6, filed on Jun. 29, 2023, and entitled "AIR COOLED RESISTOR ARRANGEMENT," which is incorporated herein by reference in its entirety.

TECHNICAL FIELD

The disclosure relates generally to electrical resistors, hereinafter referred to as resistors. In particular aspects, the disclosure relates to an air cooled brake resistor arrangement. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

For an electric vehicle, the auxiliary braking functionality can be a limiting factor when e.g. a State of Charge (SoC) level of a battery is above a predetermined threshold limit, at which electric power generated during braking cannot be absorbed by the battery. In such situation, the electric power needs to be taken care of in other suitable manners to be able to use the electric machine to control the vehicle speed. The electric power may be dissipated by an air cooled resistor arrangement. However, such resistor arrangement needs further improvement to be able to operate in a desirable manner.

SUMMARY

According to a first aspect of the disclosure, there is provided an air cooled resistor arrangement, comprising a resistor housing comprising an air inlet, an air outlet, a first inner wall extending in a direction from the air inlet to the air outlet, a second inner wall extending in the direction from the air inlet to the air outlet, the first and second inner walls forming a primary air flow passage between the air inlet and the air outlet, a first outer wall extending in the direction from the air inlet to the air outlet, and a first intermediate wall extending in the direction from the air inlet to the air outlet, the first intermediate wall being arranged between the first inner wall and the first outer wall, and a plurality of elongated resistor elements arranged in the resistor housing, each of the plurality of elongated resistor elements comprises at its end portion an electrical connector element connectable to a source of electric power, wherein the electrical connector element of each of the plurality of elongated resistor elements is arranged in a chamber formed by the first outer wall and the first intermediate wall, the plurality of elongated resistor elements extending from the chamber and into the primary air flow passage.

The first aspect of the disclosure may seek to solve the potential problem of performance degradation of the electrical connector elements caused by moisture exposure as well as to improve cooling capability of the electrical connector elements. A technical benefit may include that the electrical connector elements arranged in the chamber formed by the first outer wall and the first intermediate wall, the electrical connector elements can be sealed from the primary air flow passage and not be exposed to the air flowing between the air inlet and the air outlet. Such air flow could otherwise potentially cause moisture at the electrical connector elements, which moisture may cause electrical shortage. Thus, the electrical connector elements may not need separate and individual sealing since the chamber may form such seal against moisture. A secondary air flow passage, described in further detail below, is thus arranged between the chamber and the primary air flow passage, which may enable for properly sealing the chamber. The secondary air flow passage hereby forms a cooling barrier to the chamber.

Further, and as indicated above, the chamber may avoid the air flowing from the air inlet to the air outlet to reach the electrical connector elements which in turn may reduce an increase in temperature for the electrical connector elements arranged in the chamber. In detail, the air flowing from the air inlet to the air outlet may not be mixed with a separate coolant, e.g. a secondary air flow, arranged to cool the electrical connector elements, at least not to a substantial degree. Such mixture of air flows would otherwise cause a reduced coolant capacity for the electrical connector elements, especially the electrical connector elements positioned closest to the air outlet. Further, the resistor elements are preferably electrical resistor elements.

The chamber should preferably be construed as a passage or a corridor at which the electrical connector element of each of the plurality of elongated resistor elements are located. The chamber thus preferably forms a volume housing the electrical connector element.

Optionally in some examples, including in at least one preferred example, the plurality of elongated resistor elements may be arranged through a respective through hole in each of the first inner wall and the first intermediate wall. Optionally, in some examples, including in at least one preferred example, the air cooled resistor arrangement may further comprise a plurality of sealing elements, each sealing element being arranged between a through hole of the first intermediate wall and an envelope surface of an elongated resistor element such that the chamber forms an enclosed space. The sealing elements may advantageously further reduce the risk of air flowing in the primary air flow passage to reach the chamber.

Optionally, in some examples, including in at least one preferred example, the first inner wall may comprise at least one first through hole for allowing air to flow into a secondary air flow passage formed by the first inner wall and the first intermediate wall. A technical benefit may include that non-active portions of the elongated resistor elements can be positioned in the chamber as well as in the secondary air flow passage. The elongated resistor elements thus extend from the chamber and into the primary air flow passage via the secondary air flow passage. Active portions of the elongated resistor elements are preferably positioned in the primary air flow passage. A non-active portion should preferably be construed as a portion not heating air, while an active portion is heated and increases the temperature of the air flow contacting such active portion. A further technical benefit may include the portions of the elongated resistor elements positioned in the secondary air flow passage can be exposed to a portion of the air flow entering the air inlet. A temperature gradient of the elongated resistor elements, from the electrical connector element to an oppositely located end portion of the resistor elements, may advantageously be reduced.

Optionally, in some examples, including in at least one preferred example, the first inner wall may comprise at least one second through hole for allowing air in the secondary air flow passage to flow into the primary air flow passage. A technical benefit may include that the air flowing through the secondary air flow passage may subsequently be exhausted through the air outlet, together with the air flowing through the primary air flow passage.

Optionally, in some examples, including in at least one preferred example, the plurality of elongated resistor elements may be arranged in columns along a direction from the air inlet to the air outlet. A technical benefit may include that a substantially uniform distribution of the air flowing through the primary air flow passage can be obtained. Thus, the air flowing through the primary air flow passage may pass the columns of elongated resistor elements in sequence.

Optionally, in some examples, including in at least one preferred example, the at least one first through hole may be arranged between the air inlet and the column of elongated resistor elements positioned closest to the air inlet. A technical benefit may include that the air is unheated before entering the secondary air flow passage.

Optionally, in some examples, including in at least one preferred example, the at least one second through hole may be arranged between the air outlet and the column of elongated resistor elements positioned closest to the air outlet. A technical benefit may include that the portions of all elongated resistor elements arranged in the secondary air flow passage is exposed to the air flow, thereby enabling for sufficient cooling of the portions arranged in the secondary air flow passage.

Optionally, in some examples, including in at least one preferred example, the chamber may comprise an electrically non-conductive material. A technical benefit may include that further improved electrical sealing may be obtained. The electrically non-conductive material may also enable for improved damping capability of the electrical connector elements.

Optionally, in some examples, including in at least one preferred example, the chamber may be filled with the electrically non-conductive material. A technical benefit may include that further improved electrical sealing may be obtained.

Optionally, in some examples, including in at least one preferred example, the air cooled resistor arrangement may comprise an air flow splitter in the resistor housing, the air flow splitter being arranged at a position between the air inlet and the elongated resistor element, of the plurality of elongated resistor elements, arranged closest to the air inlet. A technical benefit may include that a portion of the air entering the air inlet may be actively directed towards the at least one first through hole of the first inner wall.

Optionally, in some examples, including in at least one preferred example, the resistor housing may further comprise a second outer wall extending in the direction from the air inlet to the air outlet, and a second intermediate wall extending in the direction from the air inlet to the air outlet, the second intermediate wall being arranged between the second inner wall and the second outer wall. A technical benefit may include that the elongated resistor elements are arranged as separate elements.

Optionally, in some examples, including in at least one preferred example, each of the plurality of elongated resistor elements may comprise at a second end portion a second electrical connector element connectable to the source of electric power, wherein the second electrical connector element of each of the plurality of elongated resistor elements is arranged in a second chamber formed by the second outer wall and the second intermediate wall. A technical benefit may include that each resistor element comprises dual connections to the source of electric power. The elongated resistor elements are hereby connected in parallel with each other. Also, arranging the second electrical connector elements in the second chamber may enable for similar advantageous technical benefits as described above in relation to the advantages of the chamber formed between the first outer wall and the first intermediate wall. Accordingly, and in some examples, including in at least one preferred example, the plurality of elongated resistor elements may extend from the chamber to the second chamber.

Optionally, in some examples, including in at least one preferred example, the air inlet may be arranged in a front wall of the resistor housing, and the air outlet is arranged in a rear wall of the resistor housing. Optionally, in some examples, including in at least one preferred example, the first inner wall, the second inner wall, the first outer wall and the first intermediate wall may each extend from the front wall to the rear wall.

Optionally, in some examples, including in at least one preferred example, each of the plurality of elongated resistor elements may be arranged equidistantly to all its neighboring elongated resistor elements. A technical benefit may include that the risk for induction of pulsations with the air cooled resistor arrangement is reduced. A reduction of noise from the air-cooled resistor arrangement may be obtained, and an increase of the operational lifetime of the air-cooled resistor arrangement may hereby be obtained. By reducing the regions of separated air flow may further increase the heat transfer between the elongated resistor elements and the air flowing between the air inlet and the air outlet. Hereby, there is a reduced risk of overheating the resistor elements. In other words, an improved and efficient cooling of the resistor elements may be obtained.

The definition "neighboring elongated resistor element" should be construed as elongated resistor element arranged directly beside each other. An elongated resistor element may have a neighboring elongated resistor element in a vertical direction within the resistor housing, i.e. perpendicular to a direction from the air inlet towards the air outlet, in a horizontal direction from the air inlet towards the air outlet, as well in an angled direction, i.e. angled with a direction component in the vertical direction as well as in the horizontal direction. However, two elongated resistor elements should not be construed as neighboring to each other when there is an elongated resistor element arranged in between these two elongated resistor elements. In such situation, the elongated resistor elements are non-neighboring to each other. Each of the elongated resistor elements is preferably arranged at a distance from all its neighboring elongated resistor elements to allow a flow of air to be directed from the air inlet to the air outlet.

According to a second aspect, there is provided a braking system for a vehicle, comprising an electric traction motor configured to propel the vehicle and to controllably regenerate electric power during regenerative braking of the vehicle, an electric machine comprising an output shaft, an air blower connected to the output shaft of the electric machine, the air blower being operable by the electric machine by rotation of the output shaft, wherein the air blower is arranged in an air conduit, an air cooled resistor arrangement according to any one of the examples described above in relation to the first aspect, the air inlet of the air cooled resistor arrangement being arranged in downstream fluid communication with the air blower, and a source of electric power electrically connected to the electric machine and to the plurality of resistor elements of the air cooled resistor, wherein the electric machine and the air cooled resistor arrangement are operated by electric power received from the electric power system, the electric power system being further electrically connected to the electric traction motor and configured to receive electric power during regenerative braking.

Effects and features of the second aspect are largely analogous to those described above in relation to the first aspect. In particular, the air cooled resistor arrangement may be advantageously operable to dissipate electric power generated by the electric traction motor during braking.

According to a third aspect, there is provided a vehicle, comprising an electric traction motor configured to propel the vehicle, a source of electric power comprising an electric storage system, wherein the source of electric power is electrically connected to the electric traction motor, and an air cooled resistor arrangement according to any one of the examples described above in relation to the first aspect, wherein the plurality of resistor elements is electrically connected to the source of electric power for dissipating electric power generated by the electric traction motor during braking.

Effects and features of the third aspect are largely analogous to those described above in relation to the first aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
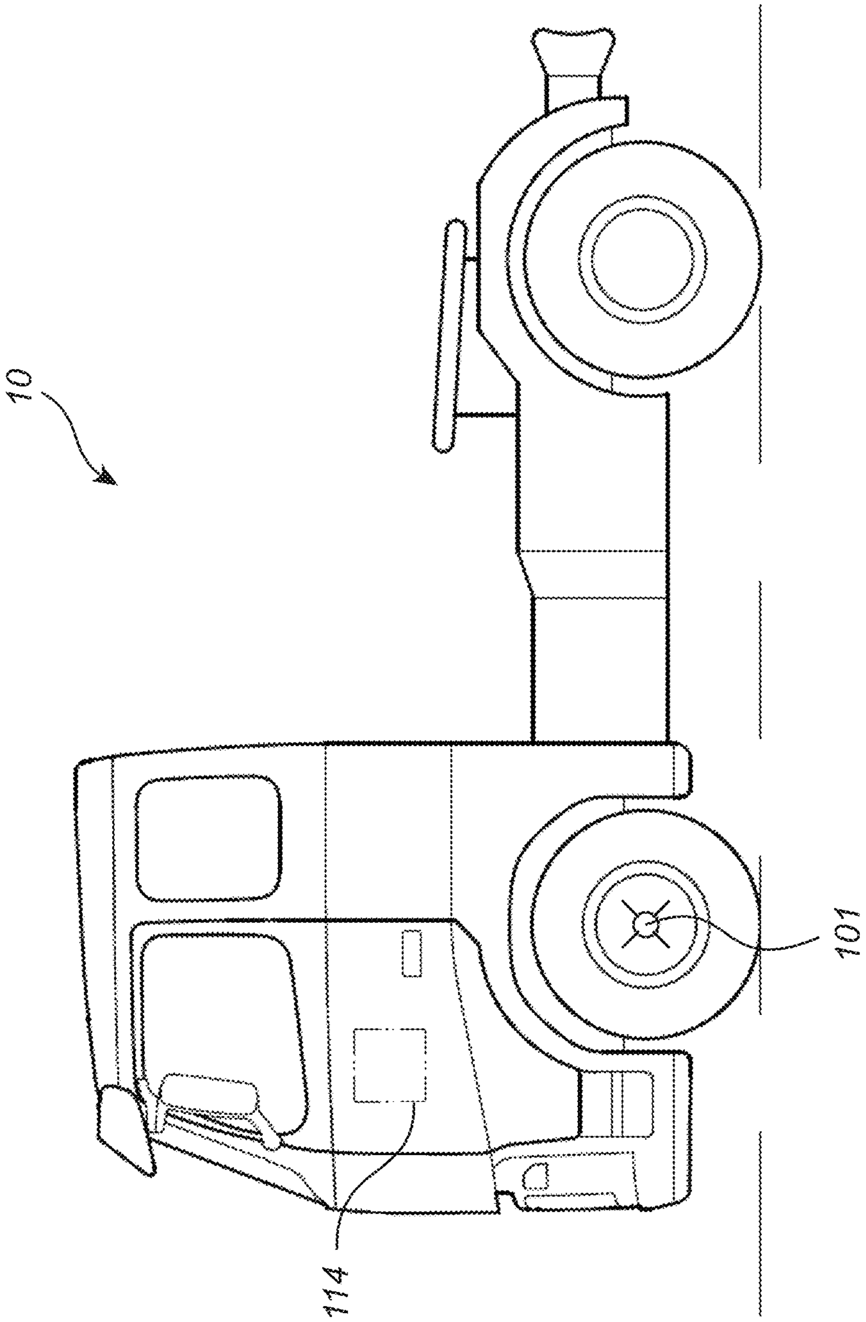
FIG. 1 is an exemplary illustration of a vehicle according to an example.

FIG. 1 is an exemplary illustration of a vehicle 10 according to an example. In particular, FIG. 1 depicts a vehicle 10 in the form of a truck. The vehicle comprises a traction motor 101 for propelling the wheels of the vehicle. In FIG. 1, the truck is depicted as being front wheel driven but is should be readily understood that the invention is equally applicable for a rear wheel driven truck, or a four wheel driven truck, etc. The traction motor 101 is in the example embodiment an electric traction motor 101 in the form of an electric machine, which is arranged to receive electric power from a source of electric power (104 in FIG. 5), which may be e.g. an electric power system and/or a fuel cell system. The vehicle 10 also comprises a control unit 114 for controlling various operations as will also be described in further detail below, and a braking system (not shown in detail in FIG. 1) operable to perform an auxiliary braking action for the vehicle 10.

Figure 2:
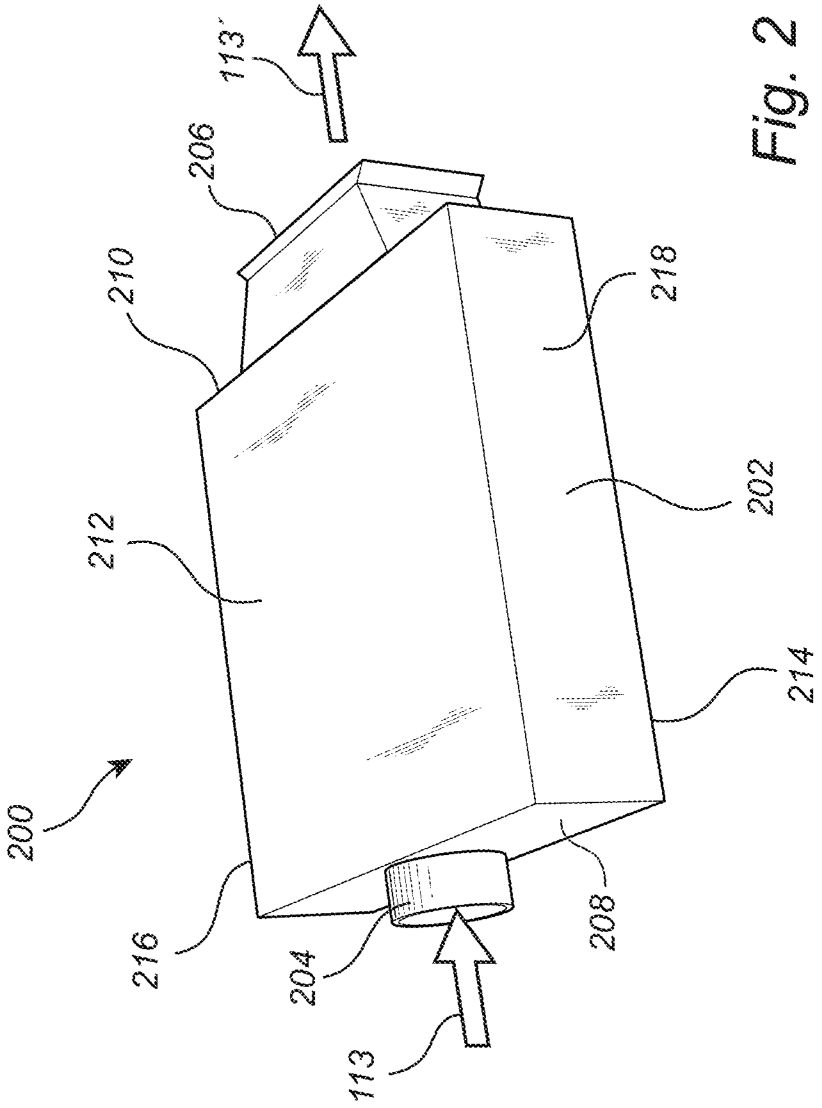
FIG. 2 is an exemplary perspective view of an exterior of a resistor housing of an air cooled resistor arrangement according to an example.

Turning to FIG. 2 which is an exemplary perspective view of an exterior of a resistor housing 202 of an air cooled resistor arrangement according 200 to an example. The resistor housing 202 comprises an air inlet 204 and an air outlet 206. The air inlet 204 is arranged to receive a flow of air 113, i.e. received air 113. The flow of air is directed through the interior of the resistor housing 202 and exhausted out through the air outlet 206 as exhausted air 113'. The air inlet 204 is arranged in a front wall 208 of the resistor housing 202. Preferably, the air inlet 204 is arranged at a center, i.e. at the middle, of the front wall 208. The air outlet 206 is arranged at a rear wall 210 of the resistor housing 202. Preferably, the air outlet 206 is arranged at a center, i.e. at the middle, of the rear wall 210. In FIG. 2, the air inlet 204 is depicted as a cylindrical air inlet 204, while the air outlet 206 is depicted as a rectangular air outlet 206. It should however be readily understood that other shapes of the air inlet 204 as well as the air outlet 206 are conceivable. For example, the air inlet 204 may have a rectangular or quadratic cross section, etc. The air outlet 206 may have a circular or quadratic cross section, etc.

Further, the resistor housing 202 comprises an upper wall 212 and a lower wall 214. The upper 212 and lower 214 walls extend from the air inlet 204 to the air outlet 206. In detail, each of the upper 212 and lower 214 walls extend from the front wall 208 to the rear wall 210 and are preferably parallel with each other. The resistor housing 202 also comprises a first outer wall 216 and a second outer wall 218. The first 216 and second 218 outer walls extend from the air inlet 204 to the air outlet 206. In detail, each of the first 216 and second 218 outer walls extend from the front wall 208 to the rear wall 210 and are preferably parallel with each other. The resistor housing 202 in FIG. 2 is thus depicted as having a rectangular cross section as seen in the air flow direction from the air inlet 204 to the air outlet 206 at which an area of the outer walls 216, 218 is smaller than an area of the respective upper 212 and lower 214 walls. It should however be readily understood that the resistor housing 202 may be arranged in other cross sectional shapes than the depicted rectangular shape, such as e.g. a quadratic cross section, etc.

Figure 3A:
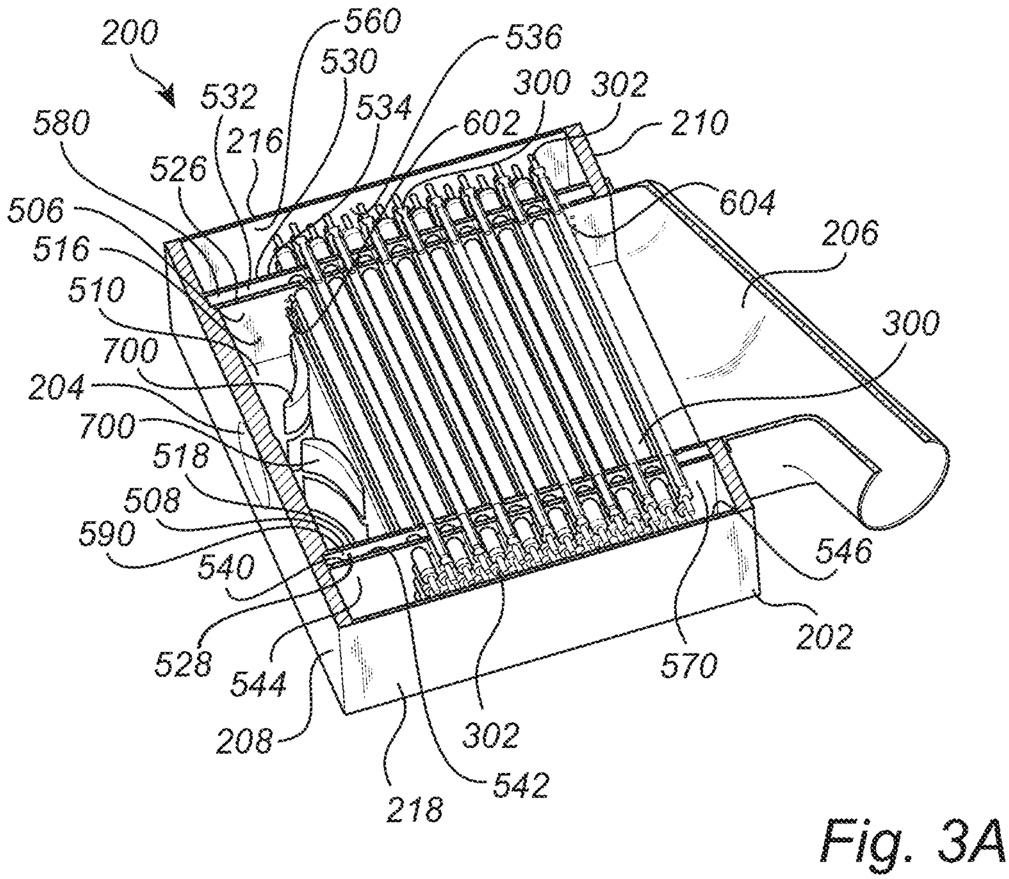
FIGS. 3A-3B are exemplary illustrations of an interior of the resistor housing, including a plurality of resistor elements of the air cooled resistor arrangement according to an example.
Figure 3B:
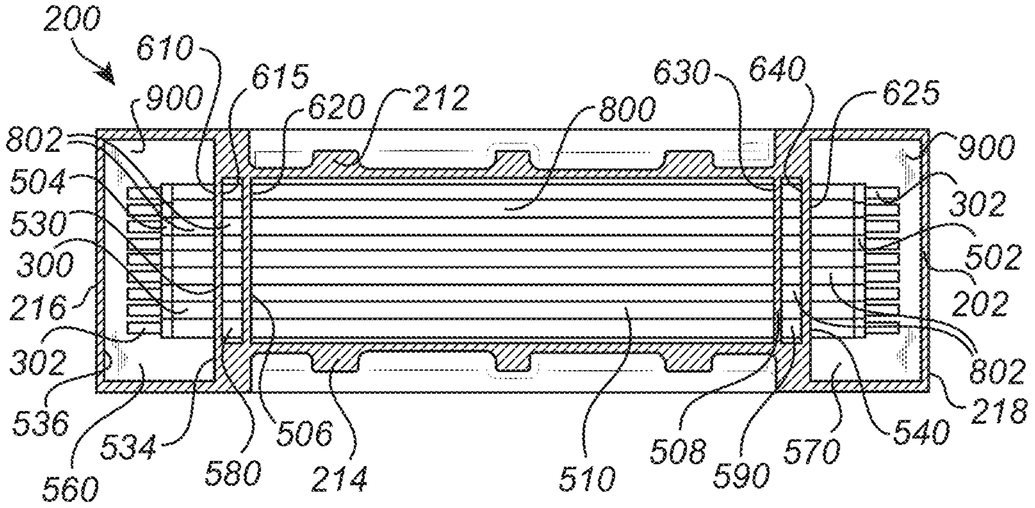

Reference is now made to FIGS. 3A-3B which are illustrations of the interior of the resistor housing 202 according to an example. As can be seen, a plurality of elongated resistor elements 300 is arranged in the resistor housing 202 between the air inlet 204 and the air outlet 206. Each of the plurality of elongated resistor elements 300 comprises an electrical connector element 302. The electrical connector element 302 is arranged to electrically connect the elongated resistor elements to a source of electric power, which can be made via electric wire cabling as will be briefly described below with reference to the description of FIG. 5. In FIGS. 3A-3B, the elongated resistor elements 300 are depicted as each comprising an electrical connector element 302 at both its end portions 502, 504, whereby the elongated resistor elements 300 extend in a direction between the first 216 and second 218 outer walls. However, it should be readily understood that the electrical connector elements 302 may also be arranged exclusively at one lateral side of the resistor housing 202, such as in the vicinity of the first 216 or second 218 outer walls. In such configuration, the elongated resistor elements 300 are preferably U-shaped within the resistor housing 202, or arranged in other manners, such as e.g. connected to the source of electric power solely at one lateral side of the resistor housing, etc.

In addition to the description above with reference to FIG. 2, the resistor housing 202 further comprises a first inner wall 506 and a second inner wall 508. Each of the first 506 and second 508 inner walls extends in a direction from the air inlet 204 to the air outlet 206. As can be seen in FIG. 3A, the first 506 and second 508 inner walls extend from the front wall 208 to the rear wall 210 and are preferably parallel with each other. Thus, the first 506 and second 508 inner walls are each attached to the front wall 208 as well as to the rear wall 210. The first 506 and second 508 inner walls form a primary air flow passage 510. In particular, the air flowing into the air inlet 204 is primarily flowing through the primary air flow passage 510 before being exhausted through the air outlet 204. In yet further detail, the first inner wall 506 preferably comprises a first inner wall surface 516 and a second inner wall surface 526. In a similar vein, the second inner wall 508 preferably comprises a first inner wall surface 518 and a second inner wall surface 528. The first inner wall surface 516 of the first inner wall 506 faces the first inner wall surface 518 of the second inner wall 508. Accordingly, the first inner wall surface 516 of the first inner wall 506, the first inner wall surface 518 of the second inner wall 508, the upper wall 212 and the lower wall 214 preferably form the primary air flow passage 510.

Moreover, the resistor housing 202 further comprises a first intermediate wall 530 and a second intermediate wall 540. Each of the first 530 and second 540 intermediate walls extends in a direction from the air inlet 204 to the air outlet 206. As can be seen in FIG. 3A, the first 530 and second 540 intermediate walls extend from the front wall 208 to the rear wall 210 and are preferably parallel with each other. Thus, the first 530 and second 540 intermediate walls are each attached to the front wall 208 as well as to the rear wall 210. Preferably, the first intermediate wall 530 comprises a first intermediate wall surface 532 and a second intermediate wall surface 534. Preferably, the first intermediate wall surface 532 of the first intermediate wall 530 faces the second inner wall surface 526 of the first inner wall 506, while the second intermediate wall surface 534 faces a first inner wall surface 536 of the first outer wall 216. In a similar vein, the second intermediate wall 540 preferably comprises a first intermediate wall surface 542 and a second intermediate wall surface 544. Preferably, the first intermediate wall surface 542 of the second intermediate wall 540 faces the second inner wall surface 528 of the second inner wall 508, while the second intermediate wall surface 544 faces a first inner wall surface 546 of the second outer wall 218.

As can be seen in FIGS. 3A-3B, the resistor housing 202 comprises a chamber 560, in the following referred to as a first chamber 560. The first chamber 560 is formed by the first outer wall 216 and the first intermediate wall 530. In detail, the first chamber 560 is formed between the first inner wall surface 536 of the first outer wall 216 and the second intermediate wall surface 534 of the first intermediate wall surface 532. In addition, the resistor housing 202 comprises a secondary air flow passage 580, in the following referred to as a first secondary air flow passage 580. The first secondary air flow passage 580 is formed by the first intermediate wall 530 and the first inner wall 506. In particular, the first secondary air flow passage 580 is preferably formed between the first intermediate wall surface 532 of the first intermediate wall 530 and the second inner wall surface 526 of the first inner wall 506. The first secondary air flow passage 580 is thus arranged between the primary air flow passage 510 and the first chamber 560.

The first inner wall 506 preferably comprises at least one first through hole 602 and at least one second through hole 604. By means of the at least one first 602 and second 604 through holes, at least a portion of the air entering the air inlet 204 can flow through the first secondary air flow passage 580. In detail, the portion of the air entering the air inlet 204 can enter the first secondary air flow passage 580 through the at least one first through hole 602 at a position upstream the plurality of elongated resistor elements 300, and exit the first secondary air flow passage 580 through the at least one second through hole 604 at a position downstream the plurality of elongated resistor elements 300. Preferably, the air cooled resistor arrangement 200 comprises an air flow splitter 700 to direct the portion of air to enter the first secondary air flow passage 580. The air flow splitter 700 is arranged between the plurality of elongated resistor elements 300 and the air inlet 204 and is preferably arranged as curved vanes. As can be seen in FIG. 3A, the curved vanes are preferably arranged in a concave shape seen from the air inlet 204. In particular, the air flow splitter is arranged between the air inlet 204 and the elongated resistor element 300 positioned closest to the air inlet 204.

In a similar vein as described above and as can be seen in FIGS. 3A-3B, the resistor housing 202 comprises a second chamber 570. The second chamber 570 is formed by the second outer wall 218 and the second intermediate wall 540. In detail, the second chamber 570 is formed between the first inner wall surface 546 of the second outer wall 218 and the second intermediate wall surface 544 of the second intermediate wall 540. In addition, the resistor housing 202 comprises a second secondary air flow passage 590. The second secondary air flow passage 590 is formed by the second intermediate wall 540 and the second inner wall 508. In particular, the second secondary air flow passage 590 is preferably formed between the second intermediate wall surface 542 of the second intermediate wall 540 and the second inner wall surface 528 of the second inner wall 508. The second secondary air flow passage 590 is thus arranged between the primary air flow passage 510 and the second chamber 570.

Although not depicted in the figures, the second inner wall 508 preferably also comprises at least one first through hole and at least one second through hole. By means of the at least one first and second through holes in the second inner wall 508, at least a portion of the air entering the air inlet 204 can flow through the second secondary air flow passage 590. In detail, the portion of the air entering the air inlet 204 can enter the second secondary air flow passage 590 through the at least one first through hole at a position upstream the plurality of elongated resistor elements 300, and exit the second secondary air flow passage 590 through the at least one second through hole at a position downstream the plurality of elongated resistor elements 300. As described above, the air cooled resistor arrangement 200 preferably comprises the air flow splitter 700 to direct the portion of air to enter the second secondary air flow passage 590.

In the example depicted in FIGS. 3A-3B, the plurality of elongated resistor elements 300 extends from the first chamber 560 to the second chamber 570. In detail, the electrical connector elements 302 of the plurality of elongated resistor elements 300 is positioned in the first 560 and second 570 chambers, respectively. The first inner wall, the first intermediate wall, the second inner wall and the second intermediate wall comprises a plurality of through holes 610, 620, 630, 640 through which the elongated resistor elements 300 extends. The through holes 610 of the first intermediate wall 530 and the through holes 640 of the second intermediate wall 540 are preferably each provided with a sealing element 615, 625 for preventing air to enter the first 560 and second 570 chambers. In particular, each sealing element is preferably arranged between a through hole 610, 640 of the first 530 and second 540 intermediate walls and an envelope surface of an elongated resistor element 300 such that the first 560 and second 570 chambers each forms an enclosed space. Active sections 800 of the plurality of elongated resistor elements 300 are thus arranged in the primary air flow passage 510, while non-active sections 802 are arranged in the first chamber 560, the first secondary air flow passage 580, the second chamber 570 and the second secondary air flow passage 590.

Furthermore, the first 560 and second 570 chambers may comprise an electrically non-conductive material 900. Preferably, each of the first 560 and second 570 chambers is filled with the electrically non-conductive material 900.

Figure 4:
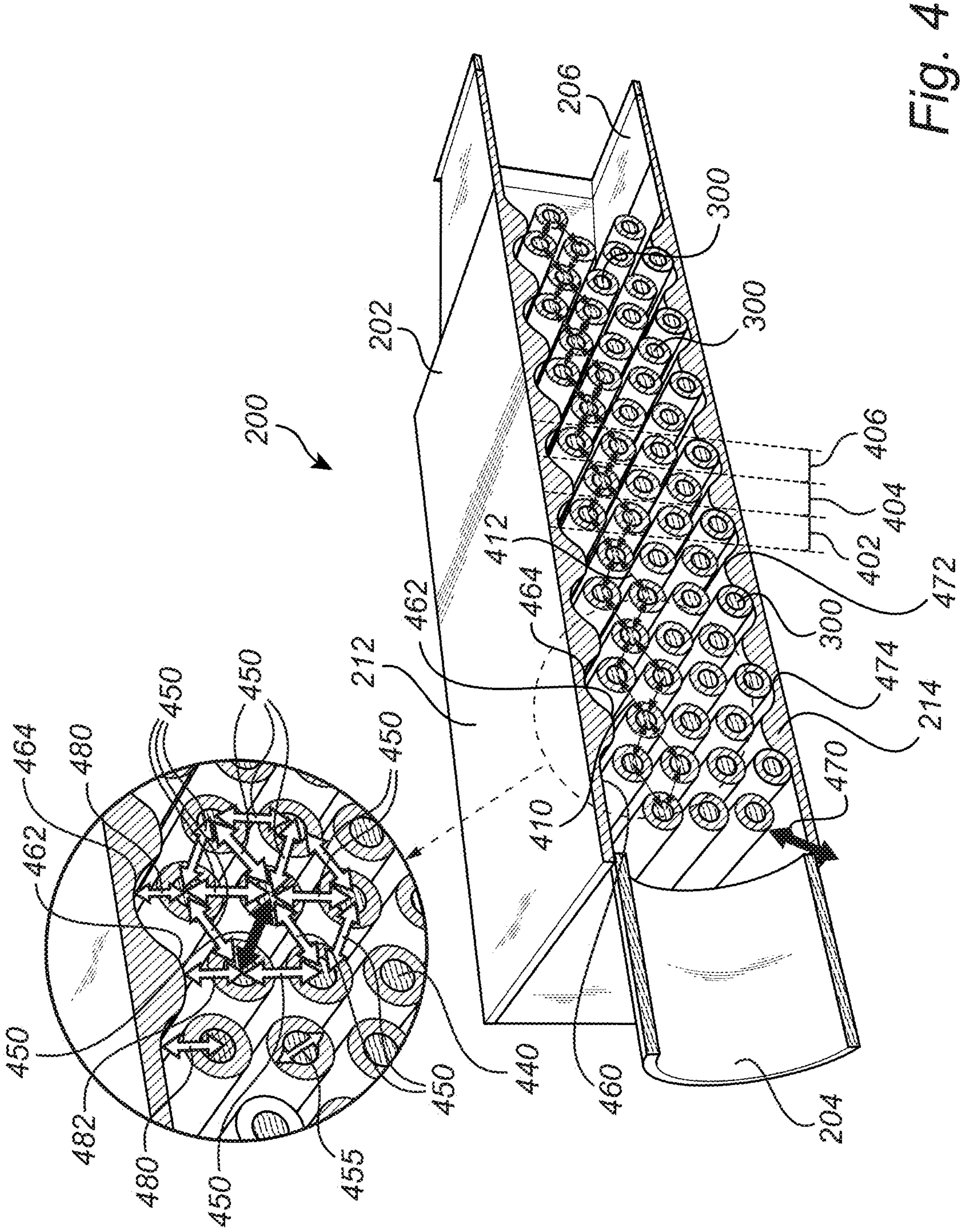
FIG. 4 is an exemplary cross-sectional view of the air cooled resistor arrangement.

Reference is now made to FIG. 4 which is an exemplary cross-sectional view of the air cooled resistor arrangement 200 according to an example. In detail, FIG. 4 illustrates a cross-section along the direction from the air inlet 204 to the air outlet 206. As described above, the air cooled resistor arrangement 200 comprises a plurality of elongated resistor elements 300. In FIG. 4, the plurality of elongated resistor elements 300 is arranged in columns 402, 404, 406 along the direction between the air inlet 204 and the air outlet 206. In the non-limiting example of FIG. 4, the plurality of resistor elements 300 is arranged in seventeen columns, where every second column 404 comprises three elongated resistor elements 300, and every other column 402, 406 comprises four elongated resistor elements 300. In detail, a column 404 of three elongated resistor elements 300 comprises a neighboring column 402, 406 of four elongated resistor elements 300. Thus, neighboring columns may advantageously comprise one different number of elongated resistor elements 300 and the explicit number of three and four elongated resistor elements 300 should merely be construed as a non-limiting exemplification. All columns, except the columns closest to the air inlet 204 and the air outlet 206, comprises two neighboring columns of elongated resistor elements 300, one at each side in the direction from the air inlet 204 to the air outlet 206. As can be seen in FIG. 4, at least a portion of the plurality of elongated resistor elements 300 comprise only two neighboring elongated resistor elements in the neighboring column.

As also exemplified in FIG. 4, the plurality of elongated resistor elements 300 is arranged in wave-shaped rows 410, 412 along the direction between the air inlet 204 and the air outlet 206. As can be seen in FIG. 4, a first wave-shaped row 410 of elongated resistor elements 300 is formed by the elongated resistor elements 300 positioned closest to the upper wall 212. A second wave-shaped row 412 of elongated resistor elements 300 is also formed within the resistor housing 202. Since neighboring columns comprises one different number of elongated resistor elements 300, the first 410 and second 412 rows share an elongated resistor element 300 for every second column. In the exemplification of FIG. 4, the resistor element 300 closest to the upper wall 212 of the columns with one less number of elongated resistor elements 300 forms part of the first 410 and the second 412 wave-shaped rows. In the non-limiting example of FIG. 4, the air cooled resistor arrangement 200 comprises six wave-shaped rows of elongated resistor elements 300.

Furthermore, each of the plurality of elongated resistor elements 300 is arranged equidistantly to all its neighboring elongated resistor elements 300. Thus, a distance 450 from one elongated resistor element 300 to its neighboring elongated resistor elements 300 is the same for all elongated resistor elements 300. The distance 450 is here depicted as the distance between axial geometric center axes 440 of the elongated resistor elements 300.

In further detail, each one of the plurality of elongated resistor elements 300 is arranged equidistantly to its neighboring elongated resistor elements 300 in the same column 402, 404, 406. In addition, each one of the plurality of elongated resistor elements 300 is arranged equidistantly to its neighboring elongated resistor elements in a neighboring column.

Furthermore, a cross-sectional area of the elongated resistor elements 300 is preferably equal for each of the elongated resistor elements 300. Thus, a diameter 455 of the cross-sectional area is preferably equal for all elongated resistor elements 300. According to a non-limiting example, the diameter 455 may be in the range between 6-16 mm, preferably 14 mm. With the example of 14 mm in diameter of the cross-sectional area, the distance 450 between axial geometric center axes 440 of neighboring elongated resistor elements 300 may advantageously be in the range between 16-20 mm, preferably 18 mm.

Moreover, and as exemplified in FIG. 4, the upper wall 212 comprises an inner surface 460. The inner surface 460 of the upper wall 212 faces the plurality of elongated resistor elements 300 and is arranged in a wave shaped pattern. In particular, the wave shaped pattern is formed by a plurality of ridges 462 and valleys 464. In the example depicted in FIG. 4, the inner surface wave shape of the upper wall 212 is arranged in a sawtooth shape. In a similar vein, the lower wall 214 also comprises an inner surface 470. The inner surface 470 of the lower wall 214 faces the plurality of elongated resistor elements 300. In other words, the inner surface 460 of the upper wall faces the inner surface 470 of the lower wall 214. The inner surface 470 of the inner wall 214 is arranged in a wave shaped. Hence, the inner surface 470 of the lower wall comprises a plurality of ridges 472 and valleys 474. In the example depicted in FIG. 4, the inner surface wave shape of the lower wall 214 is arranged in a sawtooth shape.

Furthermore, a distance 480 from the inner surface 460 of the upper wall 212 to an adjacent elongated resistor element 300 may preferably be equal for every other column 402, 406 of elongated resistor elements 300. However, a distance from the inner surface 460 of the upper wall 212 to an adjacent elongated resistor element 300 may advantageously be different for neighboring columns 402, 404 of elongated resistor elements 300. In other words, a vertical distance 480 from resistor elements 300 of the upper wave-shaped row 410 of resistor elements to a valley 464 of the inner surface 460 of the upper wall 212 is the same for all elongated resistor elements 300 of the upper wave-shaped row. In a similar vein, a vertical distance 482 from resistor elements 300 of the upper wave-shaped row 410 of resistor elements to a ridge 462 of the inner surface 460 of the upper wall 212 is the same for all elongated resistor elements 300 of the upper wave-shaped row. Also, the distance 482 to a ridge 462 is different compared to the distance 480 to a valley. The same applies for the distance between the inner surface 470 of the lower wall 214 to the elongated resistor elements 300 adjacent the lower wall 214.

Since the neighboring columns comprise one different number of elongated resistor element, the difference in distance from the resistor elements 300 of the upper wave-shaped row 410 of resistor elements to a ridge 462 and to a valley 460 may advantageously enable for an air flow area formed between the upper and lower walls to be the same for all columns 402, 404, 406. In other words, a cross-sectional area parallel to the direction of columns of resistor elements 300, which cross-sectional area is defined by the area unoccupied by elongated resistor elements 300 between the upper and lower walls is equal in size for each column.

Figure 5:
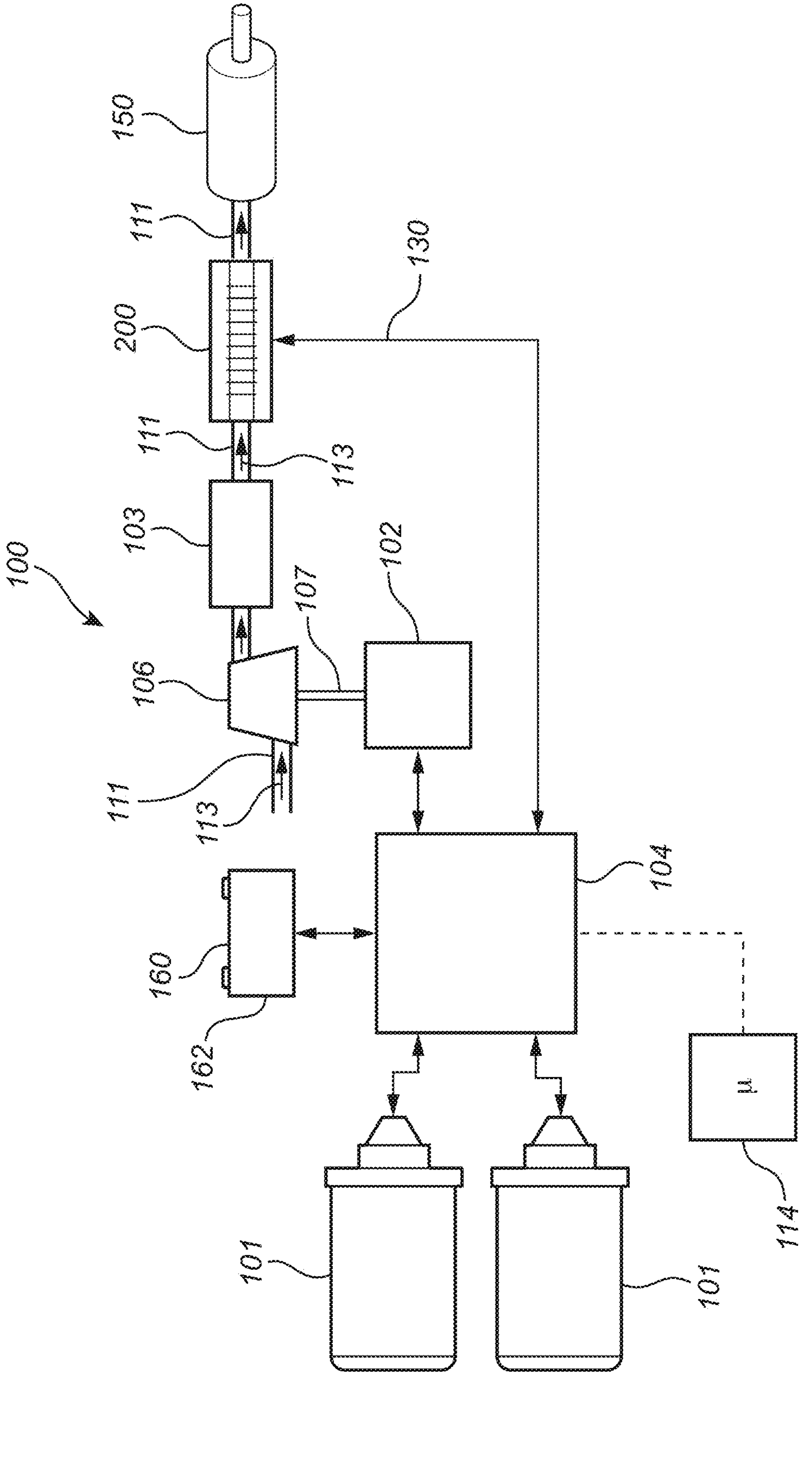
FIG. 5 is an exemplary illustration of a braking system for the vehicle according to an example.

The above described air cooled resistor arrangement 200 may be advantageously incorporated in a braking system 100 of the vehicle 10. The air cooled resistor arrangement 200 is here incorporated as an air cooled brake resistor arrangement. In order to describe the braking system 100 in further detail, reference is made to FIG. 5 which is a schematic illustration of a braking system according to an example. As can be seen in FIG. 5, the braking system 100 comprises an electric traction motor 101, in FIG. 5 illustrated as a pair of electric traction motors 101. The braking system 100 further comprises an electric power system 104 which is connected to the electric traction motor(s) 101 for supply of electric power to the electric traction motor(s) 101 when the electric traction motor(s) 101 is/are propelling vehicle 10, and to receive electric power from the electric traction motor(s) 101 when the electric traction motor(s) 101 operates in a regenerative braking mode. Thus, the braking system 100 can be referred to as an auxiliary braking system 100.

The source of electric power 104 may further advantageously comprise an electric storage system 160. The electric storage system 160 is preferably arranged in the form of a vehicle battery and will in the following be referred to as a battery 162. The battery 162 is configured to receive electric power generated by the electric traction motor(s) 101 when the electric traction motor(s) 101 operates in the regenerative braking mode. The battery 162 is also arranged to supply electric power to the electric traction motor(s) 101 when the electric traction motor(s) 101 propel the vehicle 10. Although not depicted in FIG. 5, the source of electric power 104 may comprise various components, such as traction inverters, brake inverters, a junction box, etc.

The above described control unit 114 is connected to the source of electric power 104. The control unit 114 comprises processing circuitry for controlling operation of the electric power system. The control unit 114 thus receives data from the source of electric power 104, such as e.g. a state-of-(SOC) of the battery 162, etc., and transmits control signals to the source of electric power 104. As will be evident from the below disclosure, the control signals from the control unit 114 to the source of electric power 104 may, for example, comprise instructions to which device the source of electric power 104 should supply electric power during regenerative braking.

The braking system 100 further comprises an electric machine 102 connected to the source of electric power 104. The electric machine 102 is thus operated by receiving electric power from the source of electric power 104. The electric machine 102 is thus arranged as an electric power consumer. The braking system 100 also comprises an air blower 106. The air blower 106 is preferably an air compressor 106 and will in the following be referred to as such. The air compressor 106 is arranged in an air conduit 111 and configured to receive air 113. The received air 113 is pressurized by the air compressor 106 and supplied further through the air conduit 111 downstream the air compressor 106. The air compressor 106 is connected to, and operable by, the electric machine 102. As illustrated in FIG. 5, the air compressor 106 is mechanically connected to the electric machine 102 by an output shaft 107 of the electric machine 102. In further detail, the air compressor 106 is operated by rotation of the output shaft 107, which rotation is generated by operating the electric machine 102.

According to the non-limiting example in FIG. 5, the braking system 100 further comprises a flow restriction arrangement 103 in the air conduit 111. The flow restriction arrangement 103 is arranged in downstream fluid communication with the air compressor 106 and configured to increase the pressure level of the flow of air exhausted by the air compressor 106. The braking system 100 also comprises the above described air cooled resistor arrangement 200 in the air conduit 111.

The air cooled resistor arrangement 200 is arranged in the air conduit 111 in downstream fluid communication with the air compressor 106. The air cooled resistor arrangement 200 is also electrically connected to, and operable by, the source of electric power 104. In particular, the air cooled resistor arrangement 200 is electrically connected to the source of electric power 104 by means of electric wire cabling 130 where the electrical connector elements 302 is connected to the electric wire cabling 130. Thus, also the air cooled resistor arrangement 200 is arranged as an electric power consumer. When the air cooled resistor arrangement 200 receives electric power from the source of electric power 104, the pressurized air 113 from the air compressor is heated by the air cooled resistor arrangement 200. The pressurized and heated air is thereafter directed towards the ambient environment or other components in need of thermal management. The air from the air cooled resistor arrangement 200 is preferably directed into a muffler 150 of the braking system 100. The muffler 150 reduces noise and can also provide a pressure drop of the air.

Although not depicted in FIG. 5, it should be readily understood that the control unit 114 can be connected to other components in addition to the connection to the source of electric power 104. For example, the control unit 114 may be connected to the electric traction motor(s) 101, the battery 162, the electric machine 102, the air cooled resistor arrangement 200, as well as connected to an upper layer vehicle control system (not shown).

During operation of the braking system 100, i.e. when the electric traction motor 101 operates as generators to control the vehicle speed, i.e. the vehicle 10 operates in the regenerative braking mode, electric power is transmitted from the electric traction motor 101 to the source of electric power 104. If the battery 162 is not able to receive all, or parts of the electric power generated by the electric traction motor 101, for example because of the current electric charging capacity, i.e. the level of electric power the battery is able to receive until being fully charged, has been reached, the excess electric power should preferably be dissipated. In the present case, the source of electric power 104 may be controlled to supply electric power to the electric machine 102. The electric machine 102 is hereby, by the received electric power from the electric power system 104, rotating the output shaft 107 to operate the air compressor 107. The air compressor 107 in turn pressurize air 117 and supply the pressurized air further through the air conduit 111.

Accordingly, the control circuitry of the control unit 114 determines a level of electric power dissipation for the source of electric power 104, i.e. a level of electric power that should be dissipated since it is not suitable to supply such power to the battery 162. The level of electric power dissipation may hence be a difference between the level of electric power generated during the regenerative braking and the current electric charging capacity of the battery 162. If the electric machine 102 is able to handle, i.e. receive and be operated by, electric power corresponding to the level of electric power dissipation, all excess electric power, i.e. the generated power not being supplied to the battery 162 for charging, is supplied to the electric machine 102.

However, there may be situations where the electric machine 102 is unable to receive a sufficient amount of electric power, or there is a desire to split the electric power between components of the braking system. For example, electric machine 102 may have a motor dissipation threshold. In further detail, the motor dissipation threshold is a maximum capacity of how much electric power the electric machine 102 can receive. Another limiting factor could be a temperature level of the air compressor 106, as well as a temperature level of the electric machine 102, e.g. at high ambient temperature conditions. If the electric machine 102 receives too much electric power, the rotational speed of the output shaft 107 is at a risk of being too high, or the temperature level of the air compressor 106 could be too high.

As such, the control circuitry of the control unit 114 may hereby control the source of electric power 104 to supply electric power also, or only, to the air cooled resistor arrangement 200. The source of electric power 104 may be controlled to supply electric power also to the air cooled resistor arrangement 200 for other reasons than the electric power level being higher than the motor dissipation threshold, for example to simply reduce the rotational speed of the output shaft 107 to reduce the operation of the air compressor 106, i.e. the speed of the air compressor 106. The split of electric power supply to the electric machine 102 and the air cooled resistor arrangement 200 can also, for example, be controlled to provide a desired brake performance, a low outlet temperature and/or to reduce wear of components of the braking system 100, etc. In particular, the temperature level of the air cooled resistor arrangement 200 may be used as an input parameter when determining how much electric power to supply to the electric machine 102.

Example List

Example 1: An air cooled resistor arrangement, comprising a resistor housing comprising an air inlet, an air outlet, a first inner wall extending in a direction from the air inlet to the air outlet, a second inner wall extending in the direction from the air inlet to the air outlet, the first and second inner walls forming a primary air flow passage between the air inlet and the air outlet, a first outer wall extending in the direction from the air inlet to the air outlet, and a first intermediate wall extending in the direction from the air inlet to the air outlet, the first intermediate wall being arranged between the first inner wall and the first outer wall, and a plurality of elongated resistor elements arranged in the resistor housing, each of the plurality of elongated resistor elements comprises at its end portion an electrical connector element connectable to a source of electric power, wherein the electrical connector element of each of the plurality of elongated resistor elements is arranged in a chamber formed by the first outer wall and the first intermediate wall, the plurality of elongated resistor elements extending from the chamber and into the primary air flow passage.

Example 2. The air cooled resistor arrangement of example 1, wherein the plurality of elongated resistor elements is arranged through a respective through hole in each of the first inner wall and the first intermediate wall.

Example 3. The air cooled resistor arrangement of example 2, wherein the air cooled resistor arrangement further comprises a plurality of sealing elements, each sealing element being arranged between a through hole of the first intermediate wall and an envelope surface of an elongated resistor element such that the chamber forms an enclosed space.

Example 4. The air cooled resistor arrangement of any one of the preceding examples, wherein the first inner wall comprises at least one first through hole for allowing air to flow into a secondary air flow passage formed by the first inner wall and the first intermediate wall.

Example 5. The air cooled resistor arrangement of example 4, wherein the first inner wall comprises at least one second through hole for allowing air in the secondary air flow passage to flow into the primary air flow passage.

Example 6. The air cooled resistor arrangement of any one of the preceding examples, wherein the plurality of elongated resistor elements is arranged in columns along a direction from the air inlet to the air outlet.

Example 7. The air cooled resistor arrangement of example 6, when dependent on any one of examples 4 or 5, wherein the at least one first through hole is arranged between the air inlet and the column of elongated resistor elements positioned closest to the air inlet.

Example 8. The air cooled resistor arrangement of any one of examples 6 or 7, when dependent on example 5, wherein the at least one second through hole is arranged between the air outlet and the column of elongated resistor elements positioned closest to the air outlet.

Example 9. The air cooled resistor arrangement of any one of the preceding examples, wherein the chamber comprises an electrically non-conductive material.

Example 10. The air cooled resistor arrangement of example 9, wherein the chamber is filled with the electrically non-conductive material.

Example 11. The air cooled resistor arrangement of any one of the preceding examples, wherein the air cooled resistor arrangement comprises an air flow splitter in the resistor housing, the air flow splitter being arranged at a position between the air inlet and the elongated resistor element, of the plurality of elongated resistor elements, arranged closest to the air inlet.

Example 12. The air cooled resistor arrangement of any of the preceding examples, wherein the resistor housing further comprises a second outer wall extending in the direction from the air inlet to the air outlet, and a second intermediate wall extending in the direction from the air inlet to the air outlet, the second intermediate wall being arranged between the second inner wall and the second outer wall.

Example 13. The air cooled resistor arrangement of example 12, wherein each of the plurality of elongated resistor elements comprises at a second end portion a second electrical connector element connectable to the source of electric power, wherein the second electrical connector element of each of the plurality of elongated resistor elements is arranged in a second chamber formed by the second outer wall and the second intermediate wall.

Example 14. The air cooled resistor arrangement of example 13, wherein the plurality of elongated resistor elements extending from the chamber to the second chamber.

Example 15. The air cooled resistor arrangement of any of the preceding examples, wherein the air inlet is arranged in a front wall of the resistor housing, and the air outlet is arranged in a rear wall of the transistor housing.

Example 16. The air cooled resistor arrangement of example 15, wherein the first inner wall, the second inner wall, the first outer wall and the first intermediate wall each extends from the front wall to the rear wall.

Example 17. The air cooled resistor arrangement of any of the preceding examples, wherein each of the plurality of elongated resistor elements is arranged equidistantly to all its neighboring elongated resistor elements.

Example 18. A braking system for a vehicle, comprising: an electric traction motor configured to propel the vehicle and to controllably regenerate electric power during regenerative braking of the vehicle, an electric machine comprising an output shaft, an air blower connected to the output shaft of the electric machine, the air blower being operable by the electric machine by rotation of the output shaft, wherein the air blower is arranged in an air conduit, an air cooled resistor arrangement according to any one of the preceding examples, the air inlet of the air cooled resistor arrangement being arranged in downstream fluid communication with the air blower, and a source of electric power electrically connected to the electric machine and to the plurality of resistor elements of the air cooled resistor, wherein the electric machine and the air cooled resistor arrangement are operated by electric power received from the electric power system, the electric power system being further electrically connected to the electric traction motor and configured to receive electric power during regenerative braking.

Example 19. A vehicle, comprising: an electric traction motor configured to propel the vehicle, a source of electric power comprising an electric storage system, wherein the source of electric power is electrically connected to the electric traction motor, and an air cooled resistor arrangement according to any one of examples 1-19, wherein the plurality of resistor elements is electrically connected to the source of electric power for dissipating electric power generated by the electric traction motor during braking.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An air cooled resistor arrangement, comprising:

a resistor housing comprising an air inlet, an air outlet, a first inner wall extending in a direction from the air inlet to the air outlet, a second inner wall extending in the direction from the air inlet to the air outlet, the first and second inner walls forming a primary air flow passage between the air inlet and the air outlet, a first outer wall extending in the direction from the air inlet to the air outlet, and a first intermediate wall extending in the direction from the air inlet to the air outlet, the first intermediate wall being arranged between the first inner wall and the first outer wall; and a plurality of elongated resistor elements arranged in the resistor housing, each of the plurality of elongated resistor elements comprises at its end portion an electrical connector element connectable to a source of electric power;

wherein the electrical connector element of each of the plurality of elongated resistor elements is arranged in a chamber formed by the first outer wall and the first intermediate wall, the plurality of elongated resistor elements extending from the chamber and into the primary air flow passage.

2. The air cooled resistor arrangement of claim 1, wherein the plurality of elongated resistor elements is arranged through a respective through hole in each of the first inner wall and the first intermediate wall.

3. The air cooled resistor arrangement of claim 2, wherein the air cooled resistor arrangement further comprises a plurality of sealing elements, each sealing element being arranged between a through hole of the first intermediate wall and an envelope surface of an elongated resistor element such that the chamber forms an enclosed space.

4. The air cooled resistor arrangement of claim 1, wherein the first inner wall comprises at least one first through hole for allowing air to flow into a secondary air flow passage formed by the first inner wall and the first intermediate wall.

5. The air cooled resistor arrangement of claim 4, wherein the first inner wall comprises at least one second through hole for allowing air in the secondary air flow passage to flow into the primary air flow passage.

6. The air cooled resistor arrangement of claim 1, wherein the plurality of elongated resistor elements is arranged in columns along a direction from the air inlet to the air outlet.

7. The air cooled resistor arrangement of claim 6, wherein at least one first through hole is arranged between the air inlet and the column of elongated resistor elements positioned closest to the air inlet.

8. The air cooled resistor arrangement of claim 6, wherein at least one second through hole is arranged between the air outlet and the column of elongated resistor elements positioned closest to the air outlet.

9. The air cooled resistor arrangement of claim 1, wherein the chamber is filled with an electrically non-conductive material.

10. The air cooled resistor arrangement of claim 1, wherein the air cooled resistor arrangement comprises an air flow splitter in the resistor housing, the air flow splitter being arranged at a position between the air inlet and the elongated resistor element, of the plurality of elongated resistor elements, arranged closest to the air inlet.

11. The air cooled resistor arrangement of claim 1, wherein the resistor housing further comprises a second outer wall extending in the direction from the air inlet to the air outlet, and a second intermediate wall extending in the direction from the air inlet to the air outlet, the second intermediate wall being arranged between the second inner wall and the second outer wall.

12. The air cooled resistor arrangement of claim 11, wherein each of the plurality of elongated resistor elements comprises at a second end portion a second electrical connector element connectable to the source of electric power, wherein the second electrical connector element of each of the plurality of elongated resistor elements is arranged in a second chamber formed by the second outer wall and the second intermediate wall.

13. The air cooled resistor arrangement of claim 1, wherein each of the plurality of elongated resistor elements is arranged equidistantly to all its neighboring elongated resistor elements.

14. A braking system for a vehicle, comprising:

an electric traction motor configured to propel the vehicle and to controllably regenerate electric power during regenerative braking of the vehicle;

an electric machine comprising an output shaft;

an air blower connected to the output shaft of the electric machine, the air blower being operable by the electric machine by rotation of the output shaft, wherein the air blower is arranged in an air conduit;

the air cooled resistor arrangement of claim 1, the air inlet of the air cooled resistor arrangement being arranged in downstream fluid communication with the air blower; and a source of electric power electrically connected to the electric machine and to the plurality of resistor elements of the air cooled resistor, wherein the electric machine and the air cooled resistor arrangement are operated by electric power received from the electric power system, the electric power system being further electrically connected to the electric traction motor and configured to receive electric power during regenerative braking.

15. A vehicle, comprising:

an electric traction motor configured to propel the vehicle, a source of electric power comprising an electric storage system, wherein the source of electric power is electrically connected to the electric traction motor, and the air cooled resistor arrangement of claim 1, wherein the plurality of resistor elements is electrically connected to the source of electric power for dissipating electric power generated by the electric traction motor during braking.

* * * * *